(12) United States Patent
Maruyama

(10) Patent No.: US 6,688,520 B2
(45) Date of Patent: Feb. 10, 2004

(54) AUTHENTICATION CIRCUIT, SEMICONDUCTOR DEVICE, PROCESS FOR OPERATING THE SAME, IC CARD, AND PROCESS FOR OPERATING THE SAME

(75) Inventor: Kenji Maruyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/294,711

(22) Filed: Nov. 15, 2002

(65) Prior Publication Data

US 2003/0146287 A1 Aug. 7, 2003

(30) Foreign Application Priority Data

Feb. 6, 2002 (JP) .......................................... 2002-039351

(51) Int. Cl.⁷ ................................................ G06K 7/08
(52) U.S. Cl. ........................ 235/449; 235/492; 235/487
(58) Field of Search ................................ 235/449, 492, 235/487; 340/5.8, 5.1–5.92; 380/23, 24, 25

(56) References Cited

U.S. PATENT DOCUMENTS 5,720,500 A * 2/1998 Okazaki et al. ............... 283/82
6,202,926 B1 * 3/2001 Ito et al. ....................... 235/449

FOREIGN PATENT DOCUMENTS

JP 2001-135597 5/2001

* cited by examiner

Primary Examiner—Thien M. Le
Assistant Examiner—Daniel A Hess
(74) Attorney, Agent, or Firm—Westerman, Hattori, Daniels & Adrian, LLP

(57) ABSTRACT

An authentication circuit containing at least two types of ferroelectrics having different Curie temperatures and properties of retaining charges by residual polarization. An authentication signal stored in one of the ferroelectrics is erased when the ferroelectrics are held in a Curie temperature or more of the one of the ferroelectrics and below a Curie temperature of the ferroelectrics 2. In an authentication circuit, preferably one of the ferroelectrics outputs a primary authentication signal and, when the ferroelectric 2 receives the primary authentication signal, the ferroelectric 2 outputs a secondary authentication signal, and a plurality of ferroelectrics are formed of two or more types of elements and have different element compositions, the two or more elements are selected from Na, K, Ba, Cd, Hf, O, Pb, Zr, Ti, La, Ca, Sr, Tl, Bi, a rare earth element, Nb, Ta, W, Mo, Fe, Co, and Cr.

29 Claims, 12 Drawing Sheets curie temperature of the Pb(Zr,Ti)O₃ in FIG. 3 curie temperature of the Pb(Zr,Ti)O₃ in FIG. 3

PLZT. X/65/35. $\theta$ vs. X measurement made with soft ceramics
● : maximum value at Z (f=120Hz・・・10kHz)
○ : maximum value at dielectric tan$\delta$
▲ : restriction in district observed by chemical etching.

PLZT. θ vs. Y  Parameter: X $(1-x-y)PbTiO_3 \cdot xSrTiO_3 \cdot yLaMnO_3$  $\theta_r$ vs. X parameter: y.

$(1-x)Pb(Ti_{1-y}Zr_y)O_3 \cdot xBiFeO_3$ $\theta_r$ vs. x
Parameter: y. $\theta$ in °C $(Pb_{0.97}La_{0.02})(Zr_{0.92}Ti_{0.08})O_3$ (ceramics) $\theta$ vs. p P: hydrostatic pressure In the figure, the arrow indicates a direction of pressure applied or a change in temperature. Solid line indicates a regional boudary at the time of pressure increase, while dotted-line indicates reverse trasformation.

$(Pb_{1-x}Sr_x)(Ti_{1-y}Zr_y)O_3$.   $\theta$ vs. X and Y only the ferroelectric layer and the
lower electrode portions are shown capacitor portion (using two kinds of
ferroelectrics having different curie
temperatures) of a memory device only the ferroelectric layer and the lower electrode portions are shown.

(wiring of the heating device not shown.)

memory device formed with heat generating device on one of the ferroelectrics capacitor portion.

only the ferroelectric layer and the
lower electrode portions are shown.

capacitor portion of the memory device which uses 3 kinds
of ferroelectrics having different curie temperatures Temperature variation pattern procedure to carry out authentication of a semiconductor device

AUTHENTICATION CIRCUIT, SEMICONDUCTOR DEVICE, PROCESS FOR OPERATING THE SAME, IC CARD, AND PROCESS FOR OPERATING THE SAME

CROSS-REFERENCE TO RELATED APPLICATIONS

This application is based upon and claims the benefit of priority from the prior Japanese Patent Application No. 2002-029351, filed on Feb. 6, 2002, the entire contents of which are incorporated herein by reference.

BACKGROUND OF THE INVENTION

1. Field of the Invention

The present invention relates to an authentication circuit, a semiconductor device having the authentication circuit, a process for operating the semiconductor device, an IC card having the authentication circuit, and a process for operating the IC card.

2. Description of the Related Art

Semiconductor devices, particularly, semiconductor memories having various properties are known. Among the semiconductor memories, particularly, those which retain data even when a power source is turned off are called nonvolatile memories. Among the nonvolatile memories, a nonvolatile memory which uses a ferroelectric as a material of a capacitor for holding charges and can be accessed at random is called a ferroelectric random access memory (FeRAM).

In the case where the material of a capacitor is not the ferroelectric, that is, a paraelectric, polarization is maintained only when there is a potential difference from an electrode. When the potential difference is eliminated, the polarization is not maintained, so that non-volatility is not exhibited and the memory becomes volatile. On the other hand, in the case where the material of the capacitor is the ferroelectric (in the case of the FeRAM), two residual dielectric polarization properties of different polarities are used and, even when the power source is turned off, polarization is maintained, data is retained and demonstrates non-volatility. In the case of the FeRAM, polarization can be achieved in one of two directions. By distinguishing the polarization direction, information "1" corresponding to polarization in one direction and information "0" corresponding to polarization in the other direction can be stored. The number of rewriting times as a measure of the performance of volatility is as many as $10^{10}$ to $10^{12}$. The rewriting speed is on the order of tens ns, so that high-speed performance is obtained. Consequently, recently, a system LSI using the ferroelectric is actively being developed.

Since the system LSI is used for a device using money information, personal information, and the like such as an IC card or Smart card, a countermeasure against forgery is indispensable in the system LSI. As a countermeasure against forgery, conventionally, for example, as disclosed in Japanese Patent Application Laid-Open (JP-A) No. 11-240227, a method for writing data into a storage area before scribing and then cutting out a pad being scribed in a data so that the storage area remains unaccessed is proposed. This method has, however, a problem such that since information has to be written into the storage area at the time of manufacturing a chip or mounting the chip onto a card, the method cannot be applied after a card is manufactured.

SUMMARY OF THE INVENTION

An object of the present invention is to provide an authentication circuit from which stored information cannot be decoded without being destructed, to/from which information can be written/erased even after the circuit is manufactured, and which is suitable for various devices from the viewpoint of forgery prevention, a semiconductor device having an excellent forgery preventing function suitable for a system LSI or the like, a process for operating the semiconductor device capable of performing a predetermined function while preventing forgery, an IC card having the excellent forgery preventing function, which is suitable for a Smart card or the like, and a process for operating the IC card, which can perform a predetermined function while preventing forgery.

A first authentication circuit of the present invention comprises at least two types of ferroelectrics comprising a ferroelectric 1 and a ferroelectric 2 having different Curie temperatures. Since the ferroelectrics have properties of retaining charges by residual polarization the ferroelectric functions as a nonvolatile memory. In the ferroelectrics, authentication signals as secret information for making a semiconductor device or the like perform a predetermined function are stored. When the authentication circuit is held at the Curie temperature of ferroelectrics 1 or higher and lower than the Curie temperature of the ferroelectric 2, an authentication signal stored in the ferroelectrics 1 is erased. When the authentication circuit is held at the Curie temperature of the ferroelectric 2 or higher, the authentication signal stored in the ferroelectric 2 is erased. Consequently, the authentication circuit is held at room temperature and operated, the authentication signal is output from the ferroelectric 1 to the ferroelectric 2, after that, the information stored in the ferroelectric 1 is erased. Subsequently, the authentication signal is output from the ferroelectric 2 to the semiconductor device or the like to make the semiconductor device or the like to perform a predetermined function. After that, the information stored in the ferroelectric 2 is erased. After conducting these operations, a third person cannot nondestructively re-transmit an output signal of the semiconductor device or the like stored in the authentication circuit. That is, if the third person could not give a predetermined temperature pattern corresponding to the Curie temperatures of the two or more types (n types) of ferroelectrics provided in the authentication circuit to the authentication circuit, a normal authentication signal stored in the authentication circuit cannot be output to the semiconductor device or the like. To output the normal authentication signal to the semiconductor device or the like, the third person has to destroy the authentication circuit to know the Curie temperatures of the two or more types (n types) of ferroelectrics provided in the circuit. Consequently, in the authentication circuit, authentication signals exists in the number equal to the number of the ferroelectrics provided in the circuit, and normal authentication signals are sequentially output only when a predetermined temperature pattern corresponding to the Curie temperatures of the two or more types (n types) of ferroelectrics is given, hence the authentication circuit has a superior forgery preventing ability. Since the property of the ferroelectric itself is utilized in the authentication circuit, even after a semiconductor device, an IC card or the like which includes the authentication circuit is manufactured, information can be written/erased to/from the storage area.

A second authentication circuit of the present invention comprises two or more ferroelectrics. Since the ferroelectrics have properties of retaining charges by residual polarization, the ferroelectric functions as a nonvolatile memory. In the ferroelectrics, authentication signals as secret information for making a semiconductor device or the like perform a predetermined function are stored. When only ferroelectrics 1 in the authentication circuit or the ferroelectric 2 is heated or cooled by means for thermally stimulating the ferroelectrics (such as heat generating device, cooling device, or the like) and held at a predetermined temperature and the ferroelectric 1 or the ferroelectric 2 is held at the Curie temperature of the ferroelectric 1 or the ferroelectric 2 or higher and the authentication circuit is held at a temperature lower than the Curie temperature of the ferroelectric different from the above, an authentication signal stored in the ferroelectric 1 or ferroelectric 2 is erased. Consequently, the authentication circuit is held at a predetermined temperature or less and operated, the authentication signal is output from the ferroelectric 1 or the ferroelectric 2 to the different ferroelectric, after that, the information stored in the ferroelectric 1 or ferroelectric 2 is erased. Subsequently, the authentication signal is output from the different ferroelectric to the semiconductor device or the like to make the semiconductor device or the like to perform a predetermined function. After that, the information stored in the ferroelectric 1 or ferroelectric 2 is erased. After performing these operations, a third person cannot nondestructively re-transmit an output signal of the semiconductor device or the like stored in the authentication circuit.

A semiconductor device of the present invention comprises at least an authentication circuit of the present invention. The authentication circuit for making the semiconductor device perform a predetermined function is held in a ferroelectric provided in the authentication circuit. The authentication circuit is provided with a plurality of ferroelectrics, and the authentication signals exist in the number equal to the number of the ferroelectrics provided in the circuit. Only when a predetermined temperature pattern corresponding to Curie temperatures of two or more types (n types) of the ferroelectrics is given, normal authentication signals are sequentially output. Thus, the semiconductor device has an excellent forgery preventing function.

An IC card of the present invention comprises at least an authentication circuit. An authentication signal for making the IC card perform a predetermined function is stored in a ferroelectric in the authentication circuit. The authentication circuit is provided with a plurality of ferroelectrics, and the authentication signals exist in the number equal to the number of the ferroelectrics. Only when a predetermined temperature pattern corresponding to Curie temperatures of two or more types (n types) of the ferroelectrics is given, normal authentication signals are sequentially output. Thus, the IC card has an excellent forgery preventing function.

In a first process for operating a semiconductor device of the present invention, a step for outputting at least one authentication signal from at least two types of ferroelectrics which comprise a ferroelectric 1 and a ferroelectric 2 having different Curie temperatures and properties of retaining charges by residual polarization to perform a predetermined function of the semiconductor device and erasing the at least one authentication signal stored in the ferroelectric 1 in the authentication circuit by giving temperature history of a predetermined temperature pattern is provided.

In a second process for operating a semiconductor device of the present invention, temperature history of a predetermined temperature pattern is given to some of the ferroelectrics in the semiconductor device having a second authentication circuit of the present invention. Authentication signals stored in ferroelectrics in the authentication circuit provided in the semiconductor device are sequentially erased, and a predetermined function of the semiconductor device can be performed.

In a first process for operating an IC card of the present invention, temperature history of a predetermined temperature pattern is given to the IC card of the present invention. The first process also includes a step for outputting at least one authentication signal from at least two types of ferroelectrics which comprise a ferroelectric 1 and a ferroelectric 2 having different Curie temperatures and properties of retaining charges by residual polarization to perform a predetermined function of a semiconductor device and erasing the at least one authentication signal stored in the ferroelectric 1 in the authentication circuit by giving temperature history of a predetermined temperature pattern, wherein the IC card comprises an authentication circuit which comprises at least two types of ferroelectrics comprising a ferroelectric 1 and a ferroelectric 2 having different Curie temperatures and properties of retaining charges by residual polarization, and when the authentication circuit is held at a Curie temperature of the ferroelectric 1 or higher and lower than the Curie temperature of the ferroelectric 2, an authentication signal stored in the ferroelectric 1 is erased.

In a second process for operating an IC card of the present invention, temperature history of a predetermined temperature pattern is given only to some of the ferroelectrics in the IC card having a second authentication circuit of the present invention. Authentication signals stored in ferroelectrics in the authentication circuit provided in the IC card are sequentially erased, and a predetermined function of the IC card can be performed. The IC card includes an authentication circuit which comprises at least two types of ferroelectrics which comprise a ferroelectric 1 and a ferroelectric 2 having properties of retaining charges by residual polarization, wherein the ferroelectric 1 is disposed near means for thermally stimulating the ferroelectrics, and the ferroelectric 1 is independently heated or cooled by the means for thermally stimulating, and an authentication signal stored in the ferroelectric 1 is erased by the means for thermally stimulating to perform predetermined function of the semiconductor device.

DESCRIPTION OF THE PREFERRED EMBODIMENTS

Authentication Circuit

Figure 1:
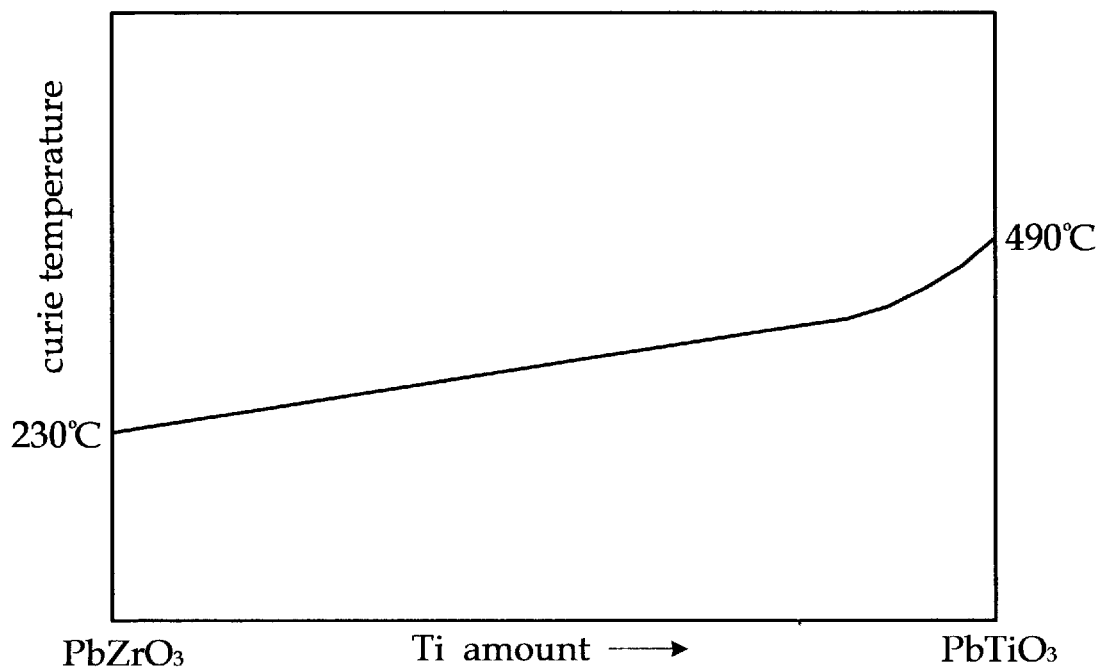
FIG. 1 is a graph showing an example of the relationship between content of Ti in PZT ($Pb(Zr_xTi_{1-x})O_3$) and the Curie temperature.

According to a first aspect of the present invention, an authentication circuit has at least two types of ferroelectrics comprising a ferroelectric 1 and a ferroelectric 2 of different Curie temperatures and other members suitably selected as necessary.

According to a second aspect of the present invention, since an authentication circuit has two or more ferroelectrics having properties of retaining charges by residual polarization, ferroelectrics 1 is disposed near means for thermally stimulating the ferroelectrics and can be independently heated or cooled by the means for thermally stimulating.

Ferroelectrics

The ferroelectrics are not limited as long as the ferroelectric has a charge retaining property by residual polarization and can function as a nonvolatile memory. According to a purpose, a ferroelectric can be properly selected from known ferroelectrics. For example, a ferroelectric formed of two or more types of elements can be preferably mentioned.

The materials of the ferroelectric are not limited, and may be selected as appropriate according to the use. As an example, the ferroelectric is formed of two or more elements selected from Na, K, Ba, Cd, Hf, O, Pb, Zr, Ti, La, Ca, Sr, Tl, Bi, a rare earth element, Nb, Ta, W, Mo, Fe, Co, Cr, and the like. These elements may be used alone or in combinations of two or more.

Concrete examples of the material of the ferroelectric are a lead-based ferroelectric material and a bismuth-based ferroelectric material.

Preferable examples of the lead-based ferroelectric material include $PZT(Pb(Zr_xTi_{1-x})O_3)$, $PLZT(Pb_yLa_{1-y}Zr_xTi_{1-x}O_3)$.

A preferable example of, the bismuth-based ferroelectric material includes $SBT(SrBi_2Ta_2O_9)$.

Any of the ferroelectric materials may contain at least one element selected from La, Ca, and Sr and, further, may contain at least one element selected from Tl, Bi, a rare earth element, Nb, Ta, W, Mo, Fe, Co, and Cr. By allowing the ferroelectric to contain any of these elements, the Curie temperature of the ferroelectric can be changed or adjusted to a desired temperature.

The ferroelectric has a property such that, when the ferroelectric is heated to a certain temperature or higher, the residual potential disappears and the ferroelectric becomes a paraelectric and, on the contrary, when the temperature of the ferroelectric is decreased to a certain temperature or lower, the paraelectric becomes a ferroelectric again. The temperature in the ferroelectric is called "Curie temperature." At a temperature higher than the Curie temperature, a domain of the ferroelectric and an electric field generated by the domain both disappear, and thus the ferroelectric becomes a paraelectric.

Examples of the Curie temperature are 230° C. in $PbZrO_3$ as one type of the ferroelectric of PZT, 490° C. in $PbTiO_3$, 365° C. in $NaNbO_3$, 418° C. in $KNbO_3$, 480° C. in $NaTaO_3$, −223 to −213° C. in $CaTiO_3$, 130° C. in $BaTiO_3$, 490° C. in $PbTiO_3$, 230° C. in $PbZrO_3$, 163° C. in $PbHfO_3$, 585° C. in $CdHfO_3$, and 850° C. in $BiFeO_3$.

In an authentication circuit of the present invention, in the case of making two or more types of ferroelectrics by two or more elements, it is possible to design so that the element compositions of the ferroelectrics are different from each other. When the two or more types of ferroelectrics have an element composition expressed by $Pb(Zr_{1-x}Ti_x)O_3$ (where 0<x<1), it is possible to design so that the values of x in the element compositions of the ferroelectrics may be different from each other.

For example, the two or more types of ferroelectrics can be obtained by using the same element compositions and then changing the element composition by depositing or injecting an element in the element composition. In this case, the ferroelectrics can be easily formed by using chemical vapor deposition such as MOCVD, to obtain two or more types of ferroelectrics having different Curie temperatures.

As shown in FIG. 1, for example, by changing the content of Ti in $PZT(Pb(Zr_xTi_{1-x})O_3)$, the Curie temperature of the PZT $(Pb(Zr_xTi_{1-x})O_3)$ is changed, so that two or more types of ferroelectrics having different Curie temperatures can be obtained. In the case of $PZT(Pb(Zr_xTi_{1-x})O_3)$, by changing the content of Ti, the Curie temperature changes from 230° C. to 490° C.

Figure 2:
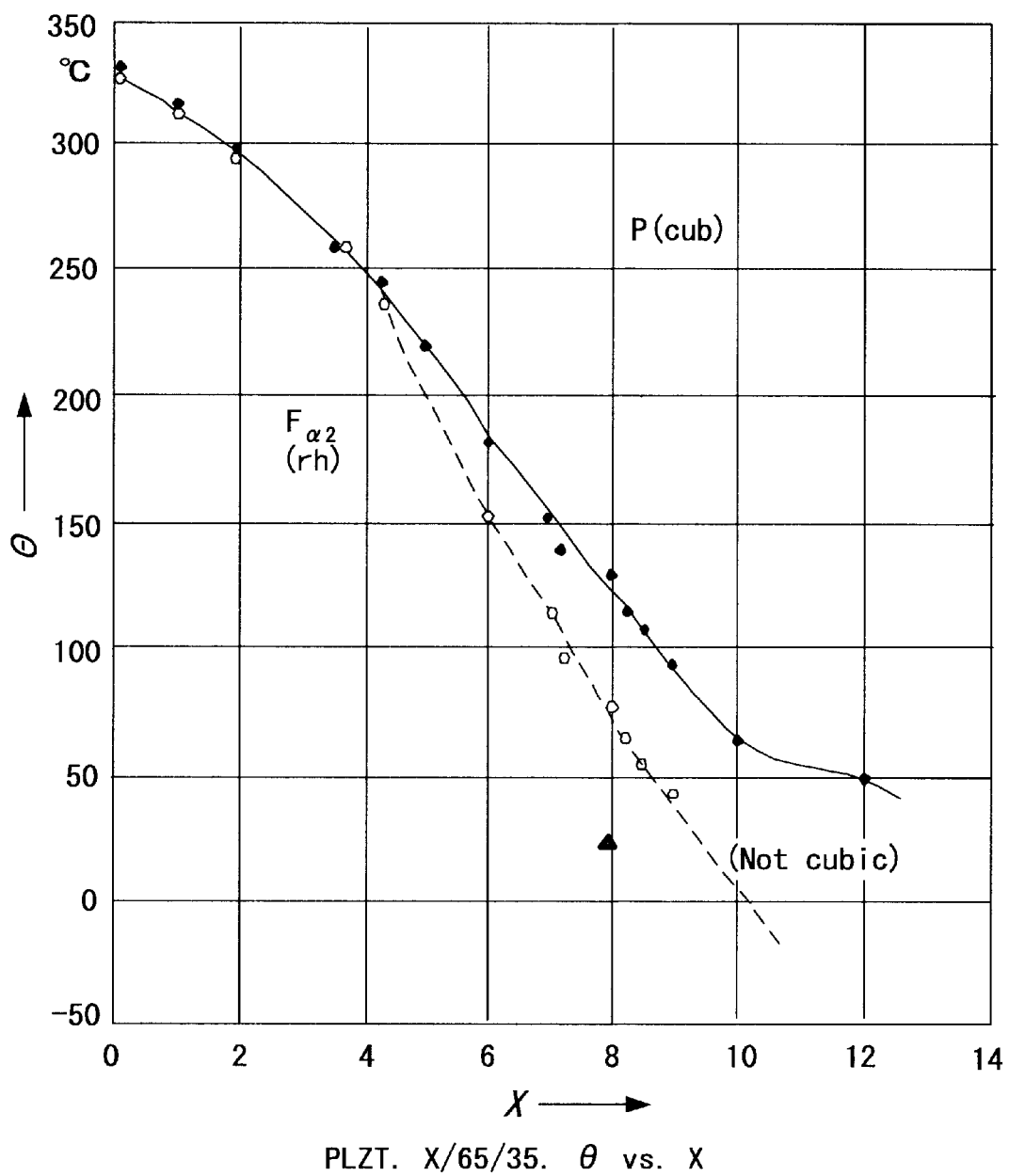
FIG. 2 is a graph showing an example of the relationship between the element composition of PLZT and the Curie temperature.
Figure 3:
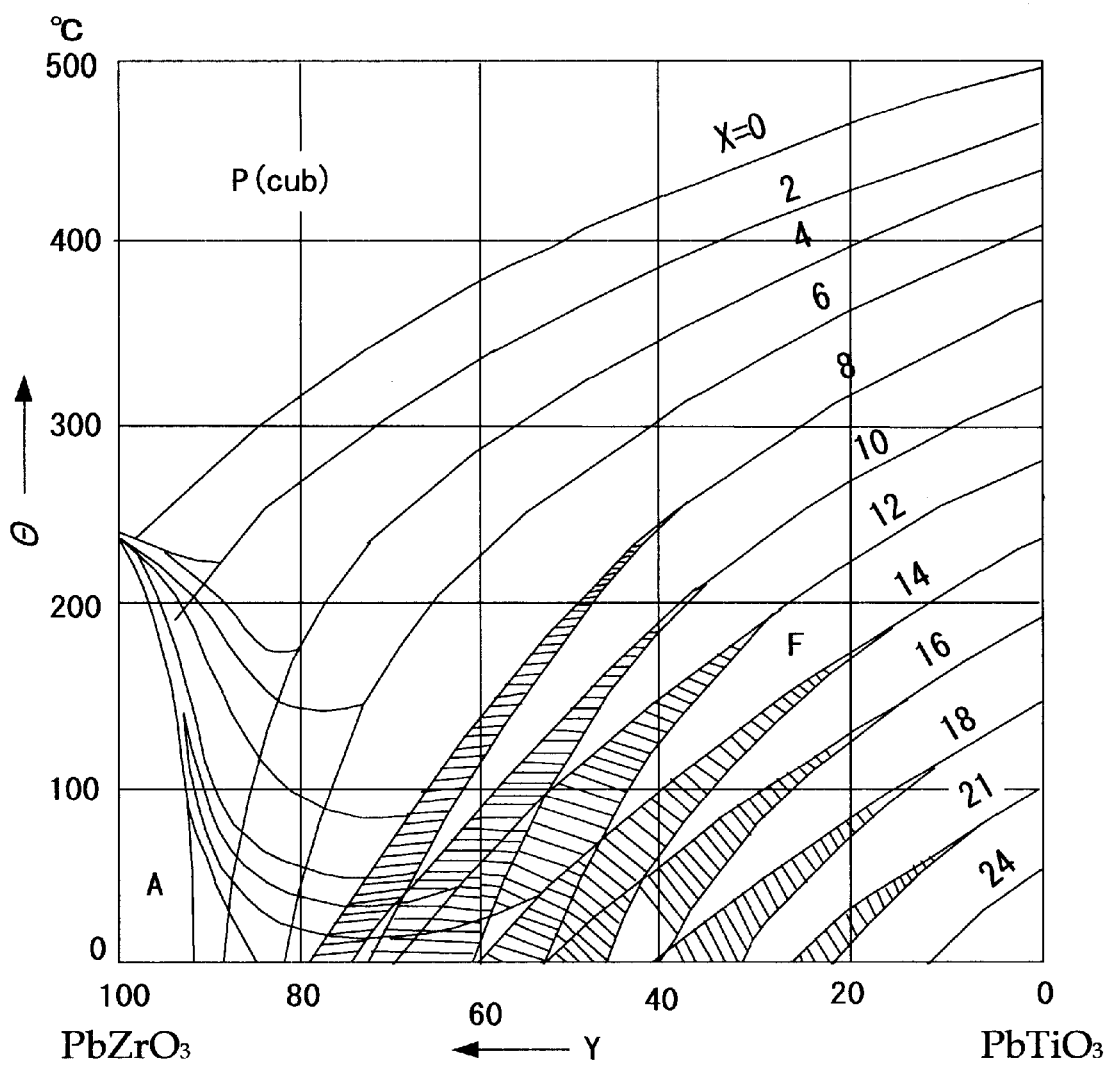
FIG. 3 is a graph showing an example of the relationship between the element composition of PLZT and the Curie temperature.
Figure 4:
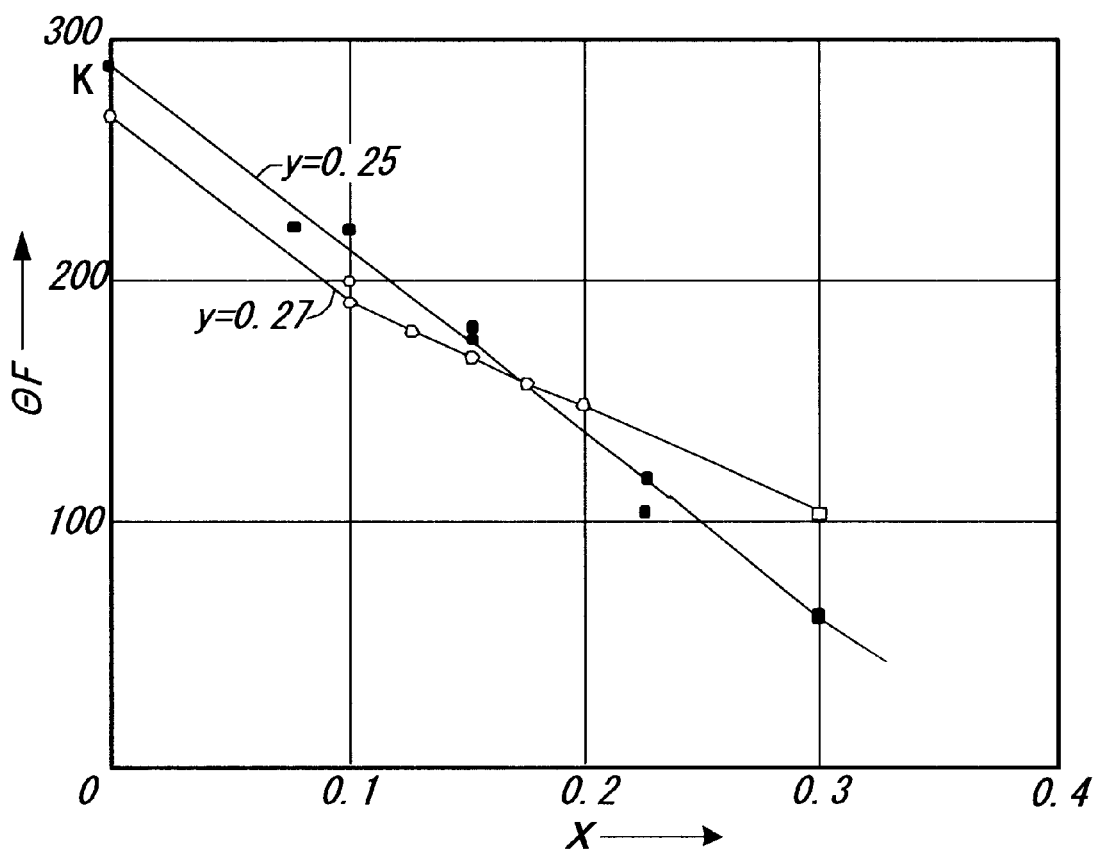
FIG. 4 is a graph showing an example of the relationship between the element composition of $PbTiO_3 \cdot xSrTiO_3 \cdot yLaMnO_3$ and the Curie temperature.
Figure 5:
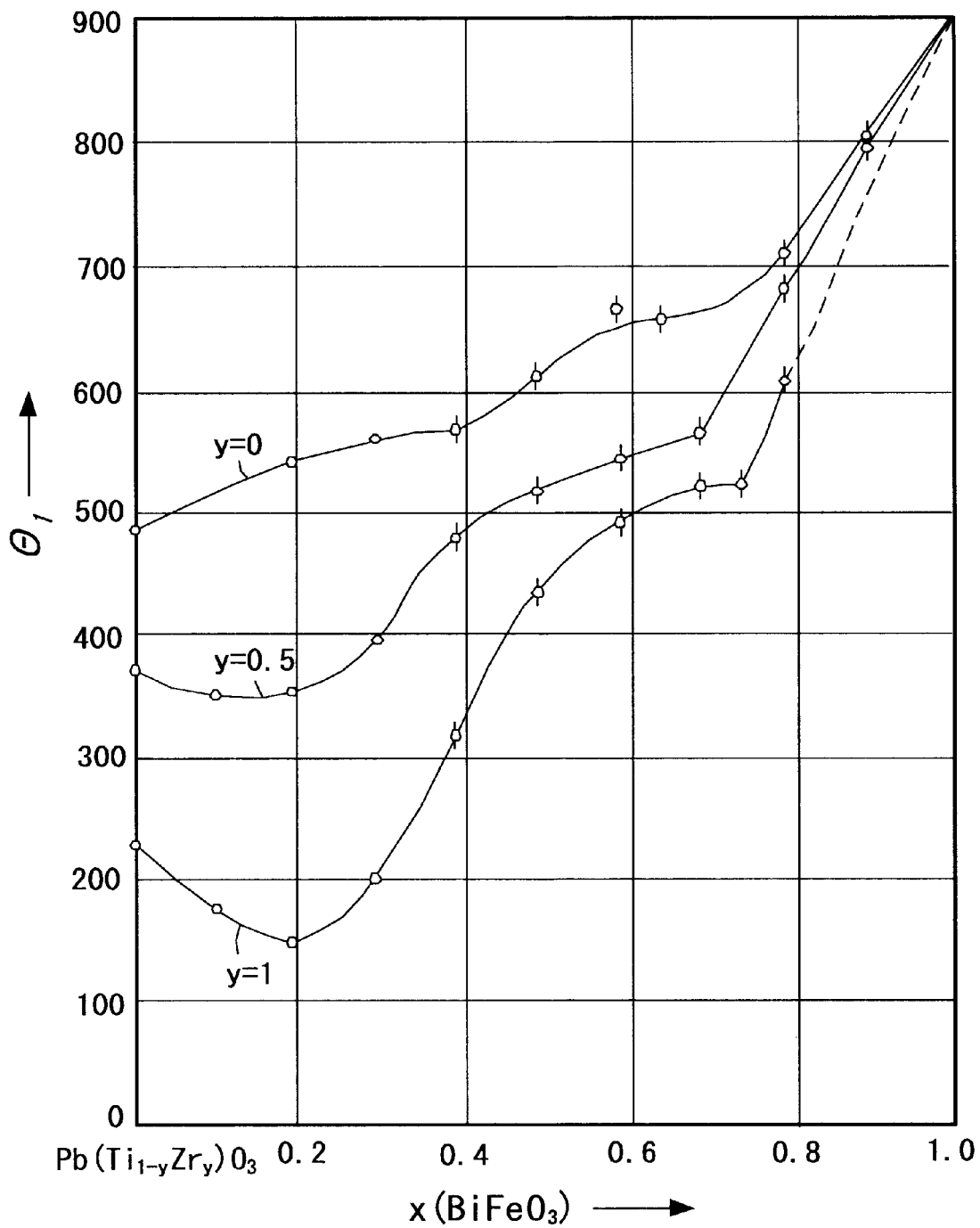
FIG. 5 is a graph showing an example of the relationship between the element composition of $(1-x)Pb(Ti_{1-x}Zr_y)O_3 \cdot xBiFeO_3$ and the Curie temperature.
Figure 6:
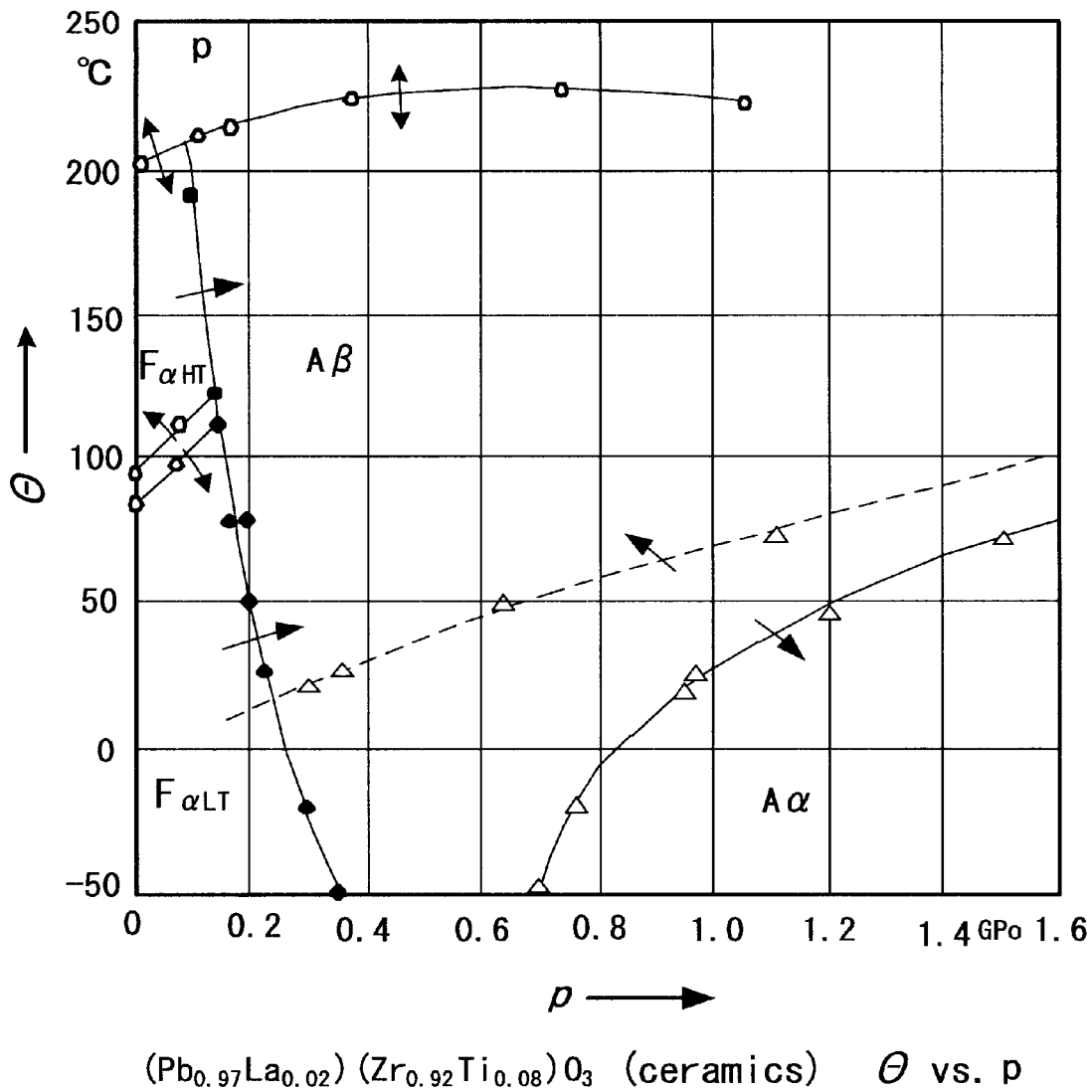
FIG. 6 is a graph showing an example of the relationship between the element composition of $(Pb_{0.97}La_{0.02})(Zr_{0.92}Ti_{0.08})O_3$ and the Curie temperature.
Figure 7:
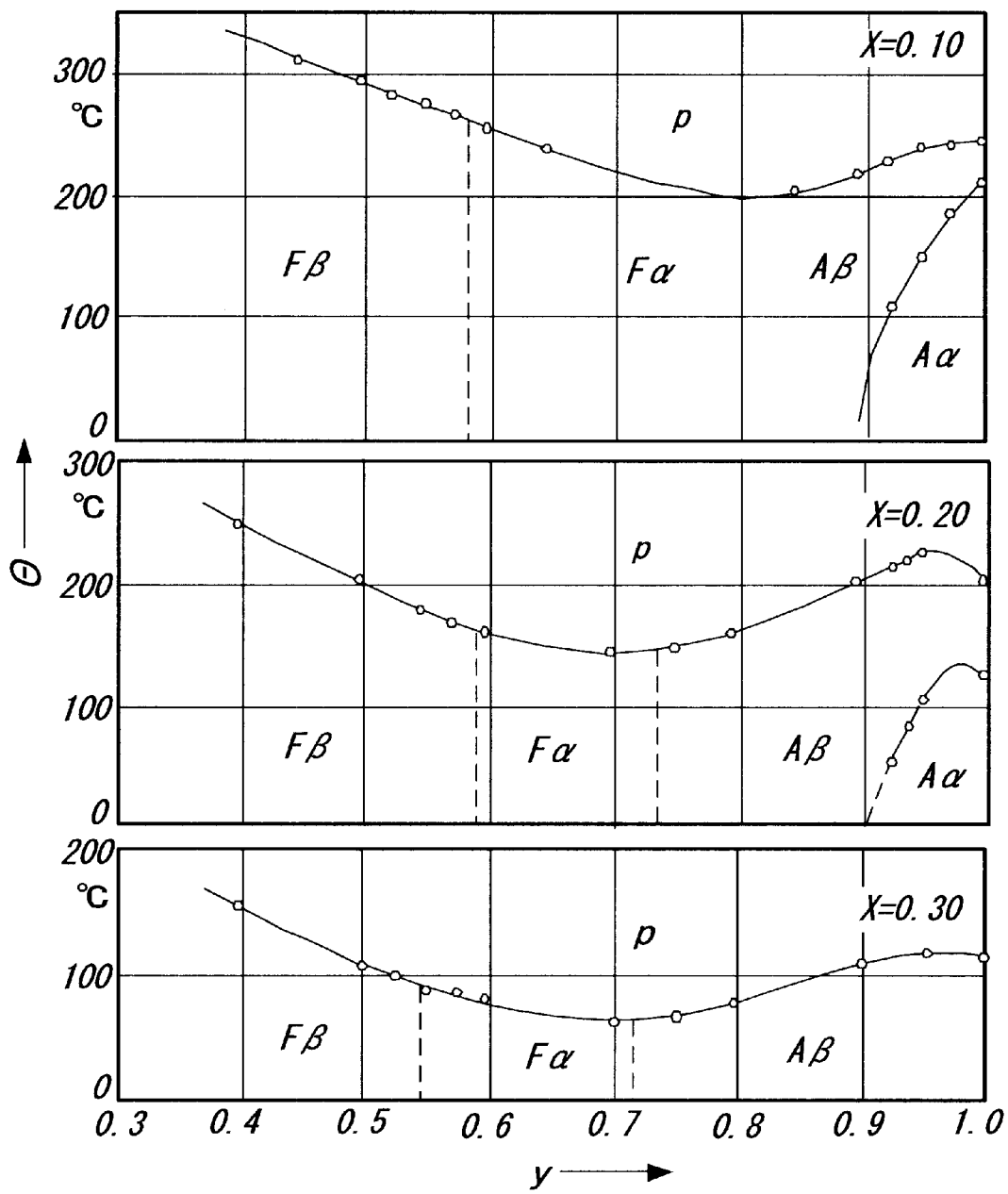
FIG. 7 is a graph showing an example of the relationship between the element composition of $(Pb_{1-x}Sr_x)(Ti_{1-y}Zr_y)O_3$ and the Curie temperature.

Each of FIGS. 2 and 3 is a graph showing the relationship between a change in the element composition of the ferroelectric, for example, PLZT and a change in the Curie temperature. In FIG. 2, '●' indicates maximum value at Z (f=120 H . . . 10 kHz), '○' indicates maximum value at dielectric tan δ, and '▲' indicates restriction in district observed by chemical etching. These mesurments were all made with soft ceramics. FIG. 4 is a graph showing the same relationship with respect to $PbTiO_3 \cdot xSrTiO_3 \cdot yLaMnO_3$. FIG. 5 is a graph showing the same relationship with respect to $(1-x)Pb(Ti_{1-x}Zr_y)O_3 \cdot xBiFeO_3$. FIG. 6 is a graph showing the same relationship with respect to $(Pb_{0.97}La_{0.02})(Zr_{0.92}Ti_{0.08})O_3$. In the figure, "P" expresses hydrostatic pressure, the arrow indicates a direction of pressure applied or change in temperature. Solid line indicates a regional boundary at the time of pressure increase, while dotted-line indicates reverse transformation. FIG. 7 is a graph showing the same relationship with respect to $(Pb_{1-x}Sr_x)(Ti_{1-y}Zr_y)O_3$.

Figure 9:
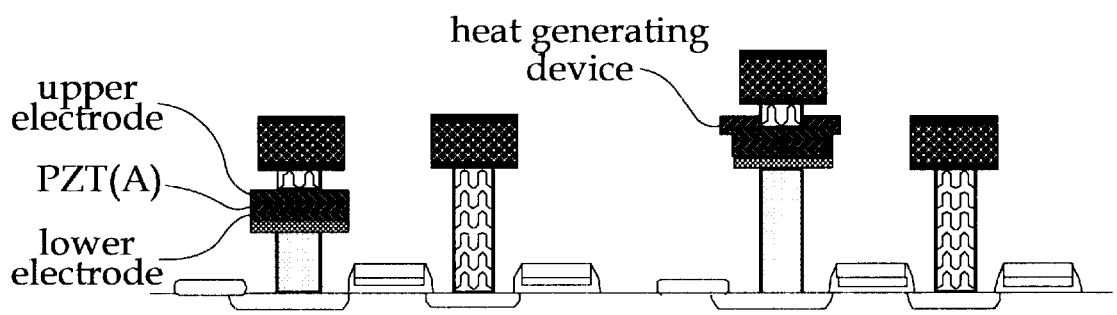
FIG. 9 is a schematic diagram showing an example of a capacitor portion (using a heat generating device) of an IC card used for an authentication circuit of the present invention.

The position at which the ferroelectric is disposed in the authentication circuit is not particularly limited and can be suitably selected according to the purpose. For example, the ferroelectric may be provided in some portions of the authentication circuit (second aspect) or in the entire authentication circuit. In the case of erasing information stored in the ferroelectric in the former case, it is sufficient to heat only the portion of the authentication circuit, that is, only the portion where the ferroelectric is disposed to make the ferroelectric a paraelectric. In the case of erasing information stored in the ferroelectric in the latter case, it is sufficient to heat the entire authentication circuit to make the ferroelectric a paraelectric. As a method for heating the portion of the authentication circuit, that is, only the portion in which the ferroelectric is disposed, for example, as shown in FIG. 9, in a ferroelectric (PZT(A) in FIG. 9) sandwiched by upper and lower electrodes, a heat generating device (heater)

can be provided on the upper electrode. In FIG. 9, only the ferroelectric layer and the lower electrode portions are illustrated to show clearer laminated structure of a ferroelectric, electrodes and a heat generating device, and wirings of the heating device are not shown.

Since the ferroelectric has two residual polarization properties of different polarities, it can be polarized in one of the two directions. By discriminating the polarization direction, information of "1" corresponding to the polarization in one direction and information of "0" corresponding to the polarization in the other direction can be stored. Even when the power source is turned off, the polarization is maintained, so that the data is retained and the ferroelectric exhibits nonvolatility.

For example, when the authentication circuit is used for a semiconductor device or the like, the direction of polarization in the ferroelectric can be detected by supplying a potential which is sufficient to switch the polarization before and after the capacitor.

The authentication circuit of the present invention can be preferably used for devices and apparatuses in various fields and can be particularly preferably used for a device requiring forgery prevention such as a semiconductor element or device in a system LSI or the like, or an IC card such as a Smart card. When the authentication circuit of the present invention is used for a semiconductor device, an IC card, or the like, in the authentication circuit, authentication signals exist in the number equal to the number of the ferroelectrics provided in the circuit. Only when a predetermined temperature pattern corresponding to the Curie temperatures of the two or more types (n types) of the ferroelectrics is given, a plurality of normal authentication signals are sequentially output, hence the authentication circuit has a superior forgery preventing ability. Since the authentication circuit uses the nature of the ferroelectric itself, even after a semiconductor device, an IC card or the like having the authentication circuit is manufactured, information can be written/erased to/from a storage area.

A method for inputting/outputting information stored in the ferroelectric in the authentication circuit is not particularly limited but can be properly selected from known methods. For example, as described in Japanese Patent Application Laid-Open (JP-A) No. 11-191149, a ferroelectric may generate and output an authentication signal under a predetermined condition on the basis of an authentication data generating algorithm stored in the ferroelectric. Semiconductor device, a process for operating the device, an IC card and, a process for operating the IC card There is no particular limitation on a semiconductor device of the present invention except that the device has the authentication circuit of the present invention. The semiconductor device comprises members such as a ROM and a CPU properly selected according to a purpose.

There is no particular limitation on an IC card of the present invention except that the IC card has the authentication circuit of the present invention. The IC card comprises members suitably selected, such as a ROM, in accordance with an object of the present invention.

In a process for operating the semiconductor device or IC card of the present invention, for example, the semiconductor device or IC card is driven at room temperature, and an authentication signal stored in one of ferroelectrics in the authentication circuit is output from the ferroelectric 1. After that, the authentication circuit allows the semiconductor device or IC card to be held at the Curie temperature of the ferroelectric 1 or higher and lower than the Curie temperature of the ferroelectric 2. In such a manner, the authentication signal stored in the ferroelectric 1 is erased. After that, the authentication circuit allows the ferroelectric 2 in the authentication circuit to be held at the Curie temperature of the ferroelectric 2 or higher so that the authentication signal stored in the ferroelectric 2 is erased. Consequently, when the semiconductor device or IC card is operated while holding the authentication circuit at room temperature, an authentication signal is output from the ferroelectric 1 to the ferroelectric 2. After that, the storage information stored in the ferroelectric 1 is erased, the authentication signal is output from the ferroelectric 2 to make the semiconductor device or IC card perform a predetermined function. After that, the storage information stored in the ferroelectric 2 is erased. A third person cannot nondestructively re-transmit the output signal of the semiconductor device or IC card stored in the authentication circuit. Specifically, the third person cannot output the normal authentication signal stored in the authentication circuit to the semiconductor device or IC card unless the predetermined temperature pattern corresponding to the Curie temperatures of the two or more types (n types) of ferroelectrics provided in the authentication circuit is given to the authentication circuit. To output the normal authentication signal to the semiconductor device or IC card, the authentication circuit has to be destroyed to know the Curie temperatures of the two or more types (n types) of ferroelectrics provided. Consequently, in the semiconductor device or IC card, only when the predetermined temperature pattern corresponding to the Curie temperatures of the two or more types (n types) ferroelectrics is given, normal authentication signals are sequentially generated and outputted, hence the authentication circuit has a superior forgery preventing ability. Since the property of the ferroelectric itself is used in the semiconductor device or IC card, even after manufacture, information can be written or erased.

Examples of the present invention will be concretely described hereinbelow but the present invention is not limited to the examples.

EXAMPLE 1

Figure 8:
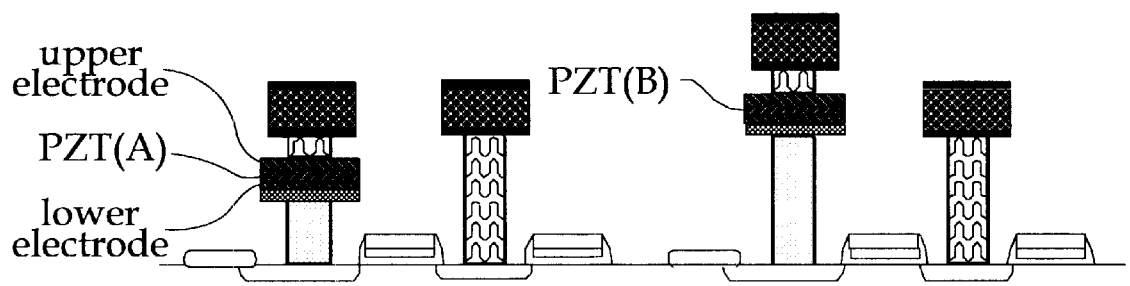
FIG. 8 is a schematic diagram showing an example of a capacitor portion (using two types of ferroelectrics) of a semiconductor device used for an authentication circuit of the present invention.

FIG. 8 is a schematic diagram illustrating an example of the capacitor portion of a semiconductor device used for the authentication circuit of the present invention. In the capacitor portion, PZT is used as a ferroelectric sandwiched by upper and lower electrodes. As the PZT, PZT(A) and PZT(B) having different Curie temperatures are employed. In FIG. 8, only ferroelectric layer and the lower electrode portions are shown.

The composition of the PZT(A) is $Pb(Zr_{0.40}Ti_{0.60})O_3$, and the composition of the PZT(B) is $Pb(Zr_{0.30}Ti_{0.70})O_3$. As shown in FIG. 1, the Curie temperature (hereinbelow, referred to as "Tc") of the PZT(B) is higher than that of PZT(A). Since dependency on the composition Ti of Tc of PZT is not accurately known, when it is assumed here that the dependency increases linearly, Tc of PZT(A) is 313° C. and Tc of PZT(B) is 334° C.

As described above, the capacitor portion having the two or more types of ferroelectrics (PZT(A) and PZT(B)) of different Curie temperatures is manufactured.

When the temperature of the whole semiconductor device having the capacitor portion shown in FIG. 8 is increased to 314° C., the temperature of the ferroelectric formed of the PZT(A) becomes equal to or higher than its Tc, so that the ferroelectric changes to a paraelectric. When the power source for maintaining the memory is turned off, therefore, information stored in the PZT(A) cannot be retained. On the other hand, the ferroelectric formed of the PZT(B) remains as the ferroelectric under the temperature condition. Consequently, even when the power source for maintaining the memory is turned off, information stored in the PZT(B) can be retained.

The semiconductor device having the capacitor portion may be used as follows to assure security. First, (1) when the Tc of the ferroelectric (PZT(A)) is set to "T1" and the Tc of the ferroelectric (PZT(B)) is set to "T2" (where T1<T2, T1=313° C., and T2=334° C.), by holding a temperature T of the semiconductor device having the capacitor portion at 25° C. in the beginning, the whole semiconductor device is operated as a nonvolatile storage device. Subsequently, (2) a primary authentication signal for operating a switch circuit which drives the whole semiconductor device is written in the storage area in the ferroelectric (PZT(A)). (3) An encryption, an encryption algorithm, or the like which is preliminarily registered is compared with the primary authentication signal. If the primary authentication signal is true, the whole semiconductor device is operated. If the primary authentication signal is false, the semiconductor device is not operated. (4) In the case of making the whole operation of the semiconductor device valid, by performing a process of an encryption algorithm or the like on the basis of the primary authentication signal, a secondary authentication signal is newly generated and is stored into a storage area in the ferroelectric (PZT(B)). (5) By increasing the temperature of the semiconductor device to 314° C. by using a heater or the like and holding the temperature, the primary authentication signal is erased. After that, (6) the temperature of the semiconductor device is decreased to 25° C. as a normal use temperature. In this case, the primary authentication signal remains erased. (7) Since it can be authenticated from the secondary authentication signal that the semiconductor device is right, the operation of the semiconductor device is allowed.

In the semiconductor device having the capacitor portion, the primary authentication signal which is indispensable to perform authentication is already erased, and it is usually impossible to decode the primary authentication signal from the secondary authentication signal. Consequently, it is impossible to re-use the semiconductor device unless the semiconductor device is reset to the initial state, the operations (1) to (7) are performed, and the normal primary authentication signal is input again. In the authentication circuit in the semiconductor device, the Curie temperature peculiar to the material of the ferroelectric is used and an operation of erasing information, or the like is performed (due to security based on the property peculiar to the material of the ferroelectric). Thus, a third person cannot freely operate the semiconductor device, and the semiconductor device has the excellent forgery preventing function.

EXAMPLE 2

A capacitor portion in a semiconductor device is fabricated in a manner similar to Example 1 except that Ferro(A) and Ferro(B) are used as ferroelectrics having Curie temperatures different from each other. The composition of the Ferro(A) is $CaTiO_3$ (with Curie temperature T2=−223° C. to −213° C.) and the composition of the Ferro(B) is $Pb(Zr_{0.40}Ti_{0.60})O_3$ (with Curie temperature T1=313° C.).

The semiconductor device having the capacitor portion may be used as follows to assure security. First, (1) the temperature T of the semiconductor device having the capacitor portion is decreased to −225° C. by using a cooling device such as a cooler in the beginning to hold the semiconductor device in a cooled state, thereby operating the whole semiconductor device as a nonvolatile storage device. (2) A primary authentication signal for operating a switch circuit which drives the whole semiconductor device is written in the storage area in the ferroelectric (Ferro(A)). (3) An encryption, an encryption algorithm, or the like which is preliminarily registered is compared with the primary authentication signal. If the primary authentication signal is true, the whole semiconductor device is operated. If the primary authentication signal is false, the semiconductor device is not operated. (4) In the case of making the whole operation of the semiconductor device valid, by performing a process of an encryption algorithm or the like on the basis of the primary authentication signal, a secondary authentication signal is newly generated and is stored into a storage area in the ferroelectric (Ferro(B)). (5) By increasing the temperature of the semiconductor device to 25° C. by using a heater or the like and holding the temperature, the primary authentication signal is erased. (6) At the temperature 25° C. as a normal use temperature of the semiconductor device, the primary authentication signal remains erased. (7) Since it can be authenticated from the secondary authentication signal that the semiconductor device is right, the operation of the semiconductor device is allowed.

In the semiconductor device having the capacitor portion, the primary authentication signal which is indispensable to perform authentication is already erased, and it is usually impossible to decode the primary authentication signal from the secondary authentication signal. Consequently, it is impossible to re-use the semiconductor device unless the semiconductor device is reset to the initial state, the operations (1) to (7) are performed, and a normal primary authentication signal is input again. In the authentication circuit in the semiconductor device, by using the Curie temperature peculiar to the material of the ferroelectric, an operation of erasing information, or the like is performed (for security based on the property peculiar to the material of the ferroelectric). Thus, a third person cannot freely operate the semiconductor device, and the semiconductor device has the excellent forgery preventing function.

EXAMPLE 3

A capacitor portion in an IC card as shown in FIG. 9 is fabricated in a manner similar to Example 1 except that PZT(A) having the composition of $Pb(Zr_{0.40}Ti_{0.60})O_3$ with Tc of 386° C. is used as ferroelectrics having different Curie temperatures and a heat generating device (such as a resistor, corresponding to the means for thermally stimulating) is provided for only one of the two ferroelectrics as shown in FIG. 9.

The IC card having the capacitor portion may be used as follows to assure security. First, (1) the temperature T of the IC card having the capacitor portion is held at 25° C. in the beginning, thereby operating the whole IC card as a nonvolatile storage device. (2) A primary authentication signal (for example, a secret number) for operating a switch circuit which drives the whole semiconductor device is written in the storage area in the ferroelectric (PZT(A)) provided with the heat generating element. (3) An encryption, an encryption algorithm, or the like which is preliminarily registered is compared with the primary authentication signal (secret number). If the primary authentication signal (secret number) is true, the whole IC card is operated. If the primary authentication signal (secret number) is false, the IC card is not operated. (4) In the case of making the whole operation of the IC card valid, by performing a process of an encryption algorithm or the like on the basis of the primary authentication signal (secret number), a secondary authentication signal is newly generated and is stored into a storage area in the ferroelectric (PZT(A)) which is not provided with the heat generating device. (5) By increasing the temperature to 390° C. by using the temperature of the heating device and holding the temperature, the primary authentication signal is erased. After that, (6) the temperature of the heat generating device is decreased to normal use temperature of 25° C. In this case, the primary authentication signal (secret number) remains erased. (7) Since it can be authenticated from the secondary authentication signal that the semiconductor device is right, the operation of the semiconductor device is allowed.

In the IC card having the capacitor portion, the primary authentication signal which is indispensable to perform authentication is already erased, and it is usually impossible to decode the primary authentication signal from the secondary authentication signal. Consequently, it is impossible to re-use the IC card unless the IC card is reset to the initial state, the operations (1) to (7) are performed, and a normal primary authentication signal (secret number) is input again. In the authentication circuit in the IC card, by using the Curie temperature peculiar to the material of the ferroelectric, an operation of erasing information, or the like is performed (for security based on the property peculiar to the material of the ferroelectric). Thus, a third person cannot freely operate the IC card, and the IC card has the excellent forgery preventing function. Even when the primary authentication signal (secret number) is erased, data (information) stored in the memory device which is not provided with the heat generating device does not disappear, so that money information, personal information, and the like stored until then is retained.

EXAMPLE 4

Figure 10:
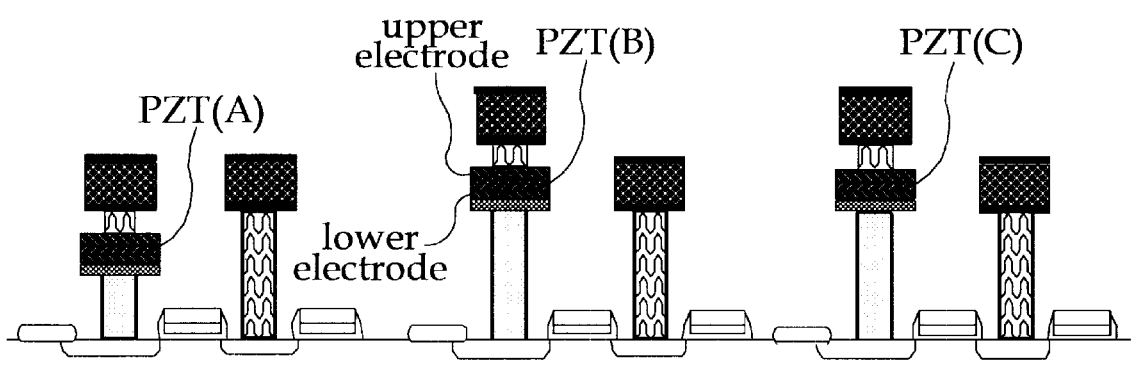
FIG. 10 is a schematic diagram showing an example of the capacitor portion (using three types of ferroelectrics) of the IC card used for the authentication circuit of the present invention.

A capacitor portion in an IC card as shown in FIG. 10 is fabricated in a manner similar to Example 1 except that PZT(A), PZT(B), and PZT(C) are used as ferroelectrics having different Curie temperatures. The composition of the PZT(A) is $Pb(Zr_{0.40}Ti_{0.60})O_3$ (with the Curie temperature T1=313° C., refer to FIG. 1). The composition of the PZT(B) is $Pb(Zr_{0.30}Ti_{0.70})O_3$ (with the Curie temperature T2=334° C., refer to FIG. 1). The composition of the PZT(C) is $Pb(Zr_{0.20}Ti_{0.80})O_3$ (with the Curie temperature T3=379° C., refer to FIG. 1).

When the temperature of the whole IC card having three types of ferroelectrics whose Curie temperatures are different from each other shown in FIG. 10 is increased to 314° C., the temperature of the ferroelectric formed by the PZT (A) becomes equal to or higher than its Tc, so that the ferroelectric changes to a paraelectric. When the power source for maintaining the memory is turned off, therefore, information stored in the PZT(A) cannot be retained. On the other hand, the ferroelectrics formed of the PZT(B) and PZT(C) remain as the ferroelectrics under the temperature condition. Consequently, even when the power source for maintaining the memory is turned off, information stored in the PZT(B) and PZT(C) can be retained.

The IC card may be used as follows to assure security. First, (1) when the Tc of the ferroelectric (PZT(A)) is set to "T1" and the Tc of the ferroelectric (PZT(B)) is set to "T2" (where T1<T2, T1=313° C., and T2=334° C.), by holding a temperature T of the IC card at 25° C. in the beginning, the whole IC card is operated as a nonvolatile storage device. (2) A primary authentication signal (for example, a secret number) for operating a switch circuit which drives the whole IC card is written in the storage area in the ferroelectric (PZT(A)). (3) An encryption, an encryption algorithm, or the like which is preliminarily registered is compared with the primary authentication signal (secret number). If the primary authentication signal (secret number) is true, the whole IC card is operated. If the primary authentication signal (secret number) is false, the IC card is not operated. (4) In the case of making the whole operation of the IC card valid, by performing a process of an encryption algorithm or the like on the basis of the primary authentication signal (secret number), a secondary authentication signal is newly generated and is stored into a storage area in the ferroelectric (PZT(B)). (5) By increasing the temperature of the IC card to 314° C. by using a heater or the like and holding the temperature, the primary authentication signal (secret number) is erased. After that, (6) the temperature of the IC card is decreased to 25° C. as a normal use temperature. In this case, the primary authentication signal (secret number) remains erased. (7) Since it can be authenticated from the secondary authentication signal that the IC card is right, the operation of the IC card is allowed. (8) By performing a process such as an encryption algorithm on the basis of the secondary authentication signal, a tertiary authentication signal is newly generated, and the tertiary authentication signal is stored in a storage area in the ferroelectric (PZT (C)). (9) By increasing the temperature of the IC card to 335° C. by using a heater or the like and holding the temperature, the secondary authentication signal is erased. After that, (10) the temperature of the IC card is decreased to 25° C. as the normal use temperature. In this case, the primary and secondary authentication signals remain erased. (11) Since it can bee authenticated by the tertiary authentication signal that the IC card is right, the operation of the IC card is allowed.

Figure 11:
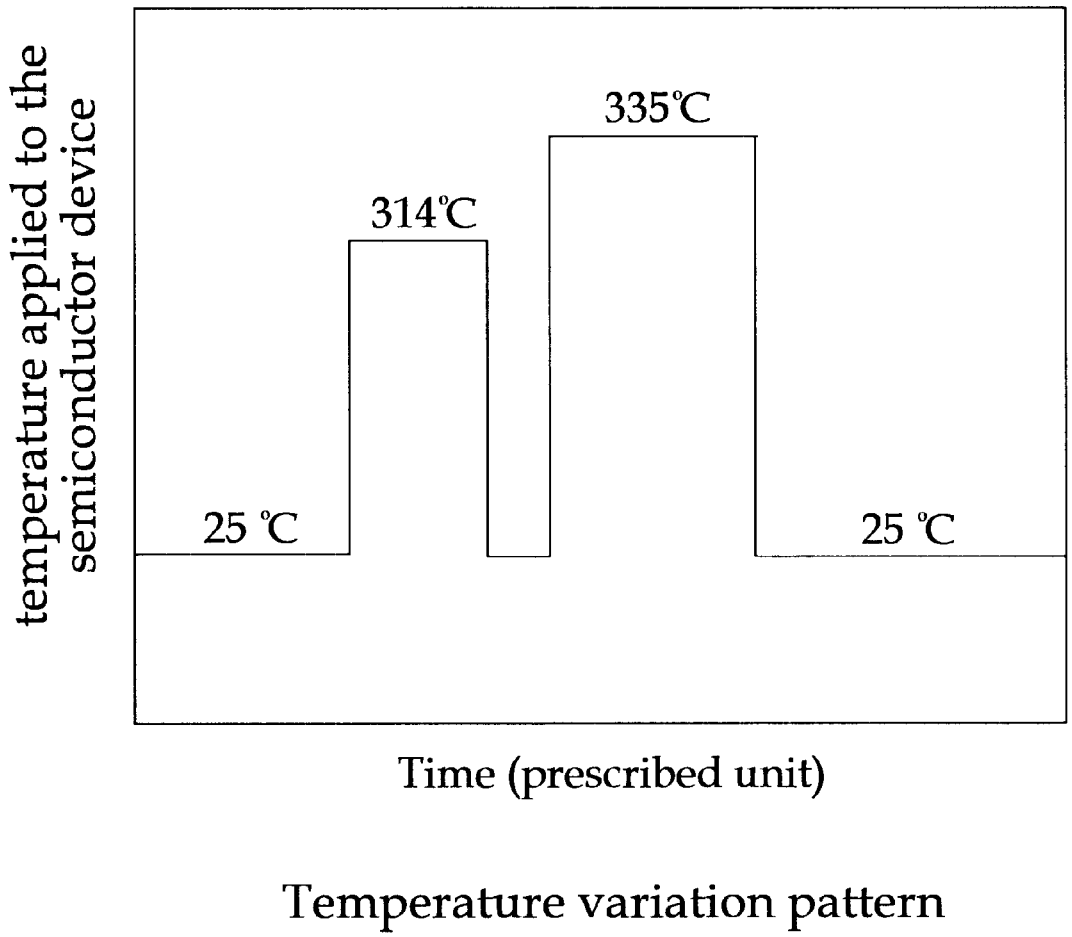
FIG. 11 is a diagram showing an example of a pattern of temperature history given to the IC card shown in FIG. 10.
Figure 12:
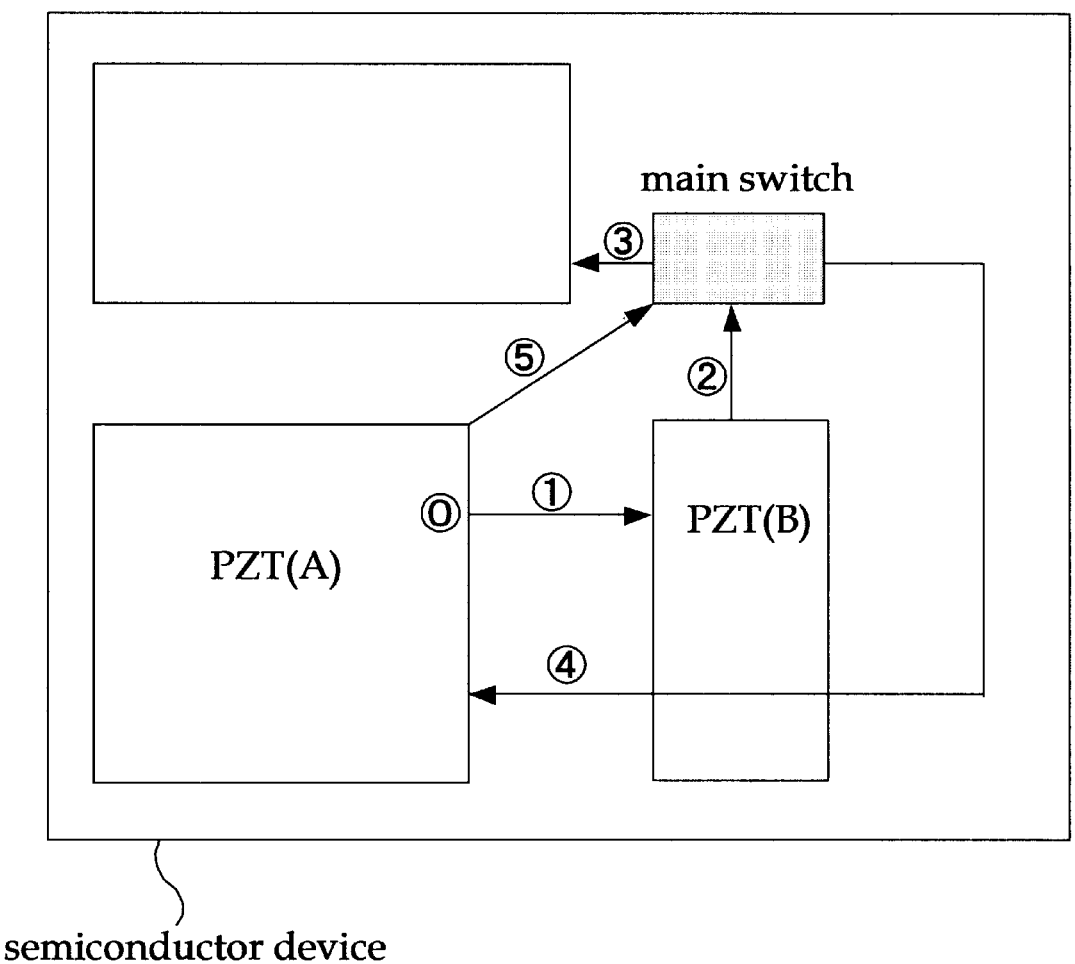
FIG. 12 is a conceptual diagram an example of the procedure of authenticating operations in the IC card shown in FIG. 10.

In the IC card, the temperature history is given in order of (1) 25° C., (2) 314° C., (3) 25° C., (4) 335° C., and (5) 25° C. as shown in FIG. 11. By giving the temperature history of this temperature pattern, primary, secondary, and tertiary authentication signals necessary to make the IC card perform the predetermined function can be sequentially generated and input/output (refer to "0" to "5" in FIG. 12). In the case of giving the temperature history to the IC card, since the primary and secondary authentication signals indispensable to perform authentication are already erased, it is usually impossible to decode the primary and secondary authentication signals from the tertiary authentication signal. Consequently, it is impossible to re-use the IC card unless the IC card is reset to the initial state, the operations (1) to (11) are performed, and normal primary and secondary authentication signals are input again. In the authentication circuit in the IC card, by using the Curie temperatures peculiar to the three types of the materials of the ferroelectrics, an operation of erasing information, or the like is performed (for security based on the property peculiar to the material of the ferroelectric). Thus, a third person cannot freely operate the IC card, and the IC card has excellent forgery preventing function.

The object of the present invention is to provide the authentication circuit capable of solving the problems of the conventional techniques, from which stored information cannot be decoded without being destructed, to/from which information can be written and erased even after the authentication circuit is manufactured, and which is suitable for various devices from the viewpoint of forgery prevention, the semiconductor device having the excellent forgery preventing function and suitable for a system LSI or the like, a process for operating the semiconductor device having a predetermined function while preventing forgery, an IC card having the excellent forgery preventing function and suitable for a Smart card or the like, and a process for operating the IC card having a predetermined function while preventing forgery.

What is claimed is:

1. An authentication circuit comprising:
    at least two types of ferroelectrics which comprise a ferroelectric 1 and a ferroelectric 2 having different Curie temperatures and properties of retaining charges by residual polarization;
    wherein an authentication signal stored in the ferroelectric 1 is erased when the ferroelectrics are held in a Curie temperature or higher of the ferroelectric 1 and lower than a Curie temperature of the ferroelectric 2.

2. An authentication circuit according to claim 1, wherein the ferroelectric 1 outputs a primary authentication signal, and when the ferroelectric 2 receives the primary authentication signal, the ferroelectric 2 outputs a secondary authentication signal.

3. An authentication circuit according to claim 1, wherein the authentication circuit comprises n (n≧2) types of the ferroelectrics including a ferroelectric 1, ferroelectric 2, ..., ferroelectric (n-1), ferroelectric n, each of which has different Curie temperature and properties of retaining charges by residual polarization,
    wherein when the Curie temperatures of the ferroelectrics are defined as $T_1, T_2, \ldots, T_{n-1}$, and $T_n$ in an order from the lowest Curie temperature, the authentication circuit is held sequentially at a temperature of $T_1$ or higher and lower than $T_2$, a temperature of $T_2$ or higher and lower than $T_3, \ldots$, a temperature of $T_{n-1}$ or higher and lower than $T_n$, and a temperature of $T_n$ or higher, an authentication signal stored in the ferroelectric having a lower Curie temperature than the temperature at which the authentication circuit is held is erased.

4. An authentication circuit according to claim 3, wherein when the ferroelectric 1 in the n types of ferroelectrics has the Curie temperature $T_1$, the ferroelectric 2 has the Curie temperature $T_2, \ldots$, the ferroelectric n-1 has the Curie temperature $T_{n-1}$, and the ferroelectric n has the Curie temperature $T_n$, the ferroelectric 1 outputs a primary authentication signal, the ferroelectric 2 outputs a secondary authentication signal when the ferroelectric 2 receives the primary authentication signal, ..., the ferroelectric n-1 outputs an (n-1)th authentication signal when the ferroelectric n-1 receives an (n-2)th authentication signal, and the ferroelectric n outputs an n-th authentication signal when the ferroelectric n receives the (n-1)th authentication signal.

5. An authentication circuit according to claim 3, wherein the n types of the ferroelectrics are formed of two or more types of elements, and each of the ferroelectrics has a different element composition.

6. An authentication circuit according to claim 5, wherein the two or more types of elements are selected from Na, K, Ba, Cd, Hf, O, Pb, Zr, Ti, La, Ca, Sr, Tl, Bi, rare earth element, Nb, Ta, W, Mo, Fe, Co, and Cr.

7. An authentication circuit according to claim 5, wherein each of the n types of the ferroelectrics has the different element composition by depositing at least one element on each of the ferroelectrics having a same element composition.

8. An authentication circuit according to claim 5, wherein the n types of the ferroelectrics has the different element composition by injecting at least one element on a same element composition.

9. An authentication circuit according to claim 3, wherein each of the n types of the ferroelectrics has an element composition expressed by $Pb(Zr_{1-x}Ti_x)O_3$ (where 0<x<1) and the value x in the element composition of each of the ferroelectrics is different to each other.

10. An authentication circuit according to claim 3, wherein at least one of the n types of the ferroelectrics has an element composition expressed by $Pb(Zr_{1-x}Ti_x)O_3$ (where 0<x<1) and the ferroelectric contains at least one element selected from La, Ca, and Sr.

11. An authentication circuit according to claim 10, wherein the ferroelectric further contains at least one element selected from Tl, Bi, rare earth element, Nb, Ta, W, Mo, Fe, Co, and Cr.

12. An authentication circuit comprising:
    at least two types of ferroelectrics which comprise a ferroelectric 1 and a ferroelectric 2 having properties of retaining charges by residual polarization;
    wherein the ferroelectric 1 is disposed near a means for thermally stimulating the ferroelectrics, and the ferroelectric 1 is independently heated or cooled by the means for thermally stimulating.

13. A semiconductor device comprising an authentication circuit, wherein the authentication circuit comprises:
    at least two types of ferroelectrics which comprise a ferroelectric 1 and a ferroelectric 2 having different Curie temperatures and properties of retaining charges by residual polarization;
    wherein an authentication signal stored in the ferroelectric 1 is erased when the ferroelectrics are held in a Curie temperature or more of the ferroelectric 1 and lower than a Curie temperature of the ferroelectric 2.

14. A semiconductor device according to claim 13, wherein the ferroelectrics are provided on a substrate in one of a horizontal and a crossing direction against the substrate.

15. An IC card comprising an authentication circuit, wherein the authentication circuit comprises:
    at least two types of ferroelectrics which comprise a ferroelectric 1 and a ferroelectric 2 having different Curie temperatures and properties of retaining charges by residual polarization;
    wherein an authentication signal stored in the ferroelectric 1 is erased when the ferroelectrics are held in a Curie temperature or more of the ferroelectric 1 and lower than a Curie temperature of the ferroelectric 2.

16. A process for operating a semiconductor device furnished with an authentication circuit, comprising:
    a step for outputting at least one authentication signal from at least two types of ferroelectrics which comprise a ferroelectric 1 and a ferroelectric 2 having different Curie temperatures and properties of retaining charges by residual polarization to perform a predetermined function of the semiconductor device and erasing the at least one authentication signal stored in the ferroelectric 1 in the authentication circuit by giving temperature history of a predetermined temperature pattern,
    wherein the authentication circuit comprises the at least two types of ferroelectrics, and the authentication signal stored in the ferroelectric 1 is erased when the ferroelectrics are held in a Curie temperature or higher of the ferroelectric 1 and lower than a Curie temperature of the ferroelectric 2.

17. A process for operating a semiconductor device according to claim 16, wherein the authentication signal stored in the ferroelectric 1 is erased by holding the authentication circuit at a Curie temperature of the ferroelectric 1 or higher in the authentication circuit and lower than the Curie temperature of the ferroelectric 2.

18. A process for operating a semiconductor device according to claim 16, wherein when the Curie temperatures of n types of the ferroelectrics including a ferroelectric 1, ferroelectric 2, . . . , ferroelectric (n−1), ferroelectric n, are defined as $T_1, T_2, \ldots, T_{n-1}$, and $T_n$ in an order from the lowest Curie temperature and the authentication circuit is held sequentially at a temperature of $T_1$ or higher and lower than $T_2$, a temperature of $T_2$ or higher and lower than $T_3, \ldots,$ a temperature of $T_{n-1}$ or higher and lower than $T_n$, and a temperature of $T_n$ or higher, an authentication signal stored in the ferroelectric 1 having the Curie temperature lower than the temperature at which the authentication circuit is held is erased.

19. A process for operating a semiconductor device according to claim 17, wherein after a primary authentication signal is output from the ferroelectric 1,
   the authentication signal stored in the ferroelectric 1 is erased by holding the authentication circuit at a Curie temperature of the ferroelectric 1 or higher in the authentication circuit and lower than the Curie temperature of the ferroelectric 2, and a secondary authentication signal is output from the ferroelectric 2 which has received the primary authentication signal.

20. A process for operating a semiconductor device according to claim 19, wherein the secondary authentication signal is output from the ferroelectric 2 only when a normal primary authentication signal is received.

21. A process for operating a semiconductor device according to claim 18, wherein when the ferroelectric 1 in the n types of the ferroelectrics has the Curie temperature $T_1$, a ferroelectric 2 has the Curie temperature $T_2, \ldots,$ a ferroelectric n−1 has the Curie temperature $T_{n-1}$, and a ferroelectric n has the Curie temperature $T_n$, after a primary authentication signal is output from the ferroelectric 1,
   a) the primary authentication signal stored in the ferroelectric 1 is erased by holding the authentication circuit at the Curie temperature of the ferroelectric 1 or higher and lower than the Curie temperature of the ferroelectric 2,
   b) a secondary authentication signal is output from the ferroelectric 2 which has received the primary authentication signal, thereafter,
   c) the secondary authentication signal stored in the ferroelectric 2 is erased by holding the authentication circuit at the Curie temperature of the ferroelectric 2 or higher and lower than the Curie temperature of the ferroelectric 3,
   d) a tertiary authentication signal is output from the ferroelectric 3 which has received the secondary authentication signal, thereafter,
   e) an (n−1)th authentication signal is output from the ferroelectric n−1 which has received the (n−2)th authentication signal, thereafter,
   f) the (n−1)th authentication signal stored in the ferroelectric n−1 is erased by holding the authentication circuit at the Curie temperature of the ferroelectric n−1 or higher and lower than the Curie temperature of the ferroelectric n,
   g) an n-th authentication signal is output from the ferroelectric n which has received the (n−1)th authentication signal.

22. A process for operating a semiconductor device, wherein the semiconductor device comprises:
   an authentication circuit which comprises at least two types of ferroelectrics which comprise a ferroelectric 1 and a ferroelectric 2 having properties of retaining charges by residual polarization;
   wherein the ferroelectric 1 is disposed near means for thermally stimulating the ferroelectrics, and the ferroelectric 1 is independently heated or cooled by the means for thermally stimulating, and an authentication signal stored in the ferroelectric 1 is erased by the means for thermally stimulating to perform predetermined function of the semiconductor device.

23. A process for operating an IC card comprising:
   a step for outputting at least one authentication signal from at least two types of ferroelectrics which comprise a ferroelectric 1 and a ferroelectric 2 having different Curie temperatures and properties of retaining charges by residual polarization to perform a predetermined function of a semiconductor device and erasing the at least one authentication signal stored in the ferroelectric 1 in the authentication circuit by giving temperature history of a predetermined temperature pattern,
   wherein the IC card comprises an authentication circuit which comprises at least two types of ferroelectrics comprising a ferroelectric 1 and a ferroelectric 2 having different Curie temperatures and properties of retaining charges by residual polarization, and when the authentication circuit is held at a Curie temperature of the ferroelectric 1 or higher and lower than the Curie temperature of the ferroelectric 2, an authentication signal stored in the ferroelectric 1 is erased.

24. A process for operating an IC card according to claim 23, wherein the authentication signal stored in the ferroelectric 1 is erased by holding the authentication circuit at a Curie temperature of the ferroelectric 1 or higher in the authentication circuit and lower than the Curie temperature of the ferroelectric 2.

25. A process for operating an IC card according to claim 24, wherein after a primary authentication signal is output from the ferroelectric 1,
   a) the authentication signal stored in the ferroelectric 1 is erased by holding the authentication circuit at a temperature of the Curie temperature of the ferroelectric 1 or higher and lower than the Curie temperature of the ferroelectric 2,
   b) a secondary authentication signal is output from the ferroelectric 2 which has received the primary authentication signal.

26. A process for operating an IC card according to claim 25, wherein the secondary authentication signal is output from the ferroelectric 2 only when a normal primary authentication signal is input to the ferroelectric 1.

27. A process for operating an IC card according to claim 24,
   wherein when the Curie temperatures of n types of the ferroelectrics including a ferroelectric 1, ferroelectric 2, . . . , ferroelectric (n−1), ferroelectric n, are defined as $T_1, T_2, \ldots, T_{n-1}$, and $T_n$ in an order from the lowest Curie temperature and the authentication circuit is held sequentially at a temperature of $T_1$ or higher and lower than $T_2$, a temperature of $T_2$ or higher and lower than $T_3, \ldots,$ a temperature of $T_{n-1}$ or higher and lower than $T_n$, and a temperature of $T_n$ or higher, an authentication signal stored in the ferroelectric 1 having the Curie temperature lower than the temperature at which the authentication circuit is held is erased.

28. A process for operating an IC card according to claim 27, wherein when the ferroelectric 1 in the n types of the ferroelectrics has the Curie temperature $T_1$, the ferroelectric 2 has the Curie temperature $T_2, \ldots,$ a ferroelectric n−1 has a Curie temperature $T_{n-1}$, and a ferroelectric n has a Curie temperature $T_n$, the semiconductor device is held at the Curie temperature of the ferroelectric 1 or higher and lower than the Curie temperature of the ferroelectric 2, after a primary authentication signal is output from the ferroelectric 1, e) the primary authentication signal stored in the ferroelectric 1 is erased, thereafter, f) a secondary authentication signal is output from the ferroelectric 2 which has received the primary authentication signal, thereafter, g) the secondary authentication signal stored in the ferroelectric 2 is erased by holding the semiconductor device at the Curie temperature of the ferroelectric 2 or higher and lower than the Curie temperature of the ferroelectric 3, thereafter, h) a tertiary authentication signal is output from the ferroelectric 3 which has received the secondary authentication signal, . . . , an (n−1)th authentication signal is output from the ferroelectric n−1 which has received the (n−2)th authentication signal, thereafter, i) the (n−1)th authentication signal stored in the ferroelectric n−1 is erased by holding the semiconductor device at the Curie temperature of the ferroelectric n and lower than the Curie temperature of the ferroelectric n, and thereafter, j) an n-th authentication signal is output from the ferroelectric n which has received the (n−1)th authentication signal.

29. A process for operating an IC card furnished with an authentication circuit wherein the IC card comprises:

an authentication circuit which comprises at least two types of ferroelectrics which comprise a ferroelectric 1 and a ferroelectric 2 having properties of retaining charges by residual polarization;

wherein the ferroelectric 1 is disposed near means for thermally stimulating the ferroelectrics, and the ferroelectric 1 is independently heated or cooled by the means for thermally stimulating, and an authentication signal stored in the ferroelectric 1 is erased by the means for thermally stimulating to perform predetermined function of the semiconductor device.

* * * * *

UNITED STATES PATENT AND TRADEMARK OFFICE
CERTIFICATE OF CORRECTION

PATENT NO. : 6,688,520 B2
DATED : February 10, 2004
INVENTOR(S) : Kenji Maruyama It is certified that error appears in the above-identified patent and that said Letters Patent is hereby corrected as shown below:

<u>Title page,</u>
Item [30], Foreign Application Priority Data, please correct Japanese Patent Application Number "2002-039351" to be -- 2002-029351 --.

Signed and Sealed this

First Day of June, 2004

JON W. DUDAS
*Acting Director of the United States Patent and Trademark Office*